United States Patent
Shantz

(10) Patent No.: US 12,246,567 B2
(45) Date of Patent: Mar. 11, 2025

(54) SUSPENSION MOUNTS FOR A VEHICLE

(71) Applicant: Zephyros, Inc., Romeo, MI (US)

(72) Inventor: Jeff Shantz, Romeo, MI (US)

(73) Assignee: Zephyros, Inc., Romeo, MI (US)

( * ) Notice: Subject to any disclaimer, the term of this patent is extended or adjusted under 35 U.S.C. 154(b) by 0 days.

(21) Appl. No.: 17/752,127

(22) Filed: May 24, 2022

(65) Prior Publication Data

US 2022/0297491 A1 Sep. 22, 2022

Related U.S. Application Data

(63) Continuation of application No. 16/856,579, filed on Apr. 23, 2020, now Pat. No. 11,345,205.

(60) Provisional application No. 62/837,880, filed on Apr. 24, 2019.

(51) Int. Cl.
*B60G 13/00* (2006.01)
*B62D 21/11* (2006.01)
*B62D 25/08* (2006.01)
*B62D 27/02* (2006.01)
*B62D 29/00* (2006.01)

(52) U.S. Cl.
CPC ............ *B60G 13/003* (2013.01); *B62D 21/11* (2013.01); *B62D 27/02* (2013.01); *B60G 2206/71* (2013.01); *B60G 2206/72* (2013.01)

(58) Field of Classification Search
CPC ............... B60G 13/001; B60G 13/003; B60G 2206/71; B60G 2206/72; B62D 21/11; B62D 27/02; B62D 29/002; B62D 25/088
See application file for complete search history.

(56) References Cited

U.S. PATENT DOCUMENTS

| | | |
|---|---|---|
| 3,944,631 A | 3/1976 | Yu et al. |
| 3,984,497 A | 10/1976 | Owens et al. |
| 4,034,013 A | 7/1977 | Lane |
| 4,096,202 A | 6/1978 | Farnham et al. |
| 4,304,709 A | 12/1981 | Salee |
| 4,306,040 A | 12/1981 | Baer |
| 4,495,324 A | 1/1985 | Chacko et al. |
| 4,536,436 A | 8/1985 | Maeoka et al. |
| 6,516,913 B1 | 2/2003 | Hartel |

(Continued)

FOREIGN PATENT DOCUMENTS

| | | | | |
|---|---|---|---|---|
| DE | 102016202755 A1 | * | 8/2017 | ............... B22F 7/08 |
| EP | 0594131 A1 | * | 4/1994 | |
| WO | WO-2024039714 A1 | * | 2/2024 | ............ B62D 25/00 |

OTHER PUBLICATIONS

Description Translation for EP 0594131 from Espacenet (Year: 1994).*

*Primary Examiner* — Jason D Shanske
*Assistant Examiner* — Daniel M. Keck
(74) *Attorney, Agent, or Firm* — The Dobrusin Law Firm, PC

(57) ABSTRACT

A suspension mount comprising a carrier with a first portion and a second portion, an activatable material selectively disposed on the carrier, one or more bridges connecting the first portion and the second portion of the carrier, wherein the first portion and the second portion of the carrier each include one or more damper mounts, and wherein the first portion corresponds to a left side and the second portion corresponds to the right side so that the suspension mount is attachable to a vehicle in one direction.

18 Claims, 4 Drawing Sheets

(56) References Cited

U.S. PATENT DOCUMENTS

| | | | |
|---|---|---|---|
| 7,360,621 B2 | 4/2008 | Komiya | |
| 7,878,287 B2* | 2/2011 | Buchwitz | B62D 21/11 |
| | | | 180/311 |
| 10,173,727 B2* | 1/2019 | Li | B62D 25/00 |
| 2007/0090666 A1* | 4/2007 | Brennecke | B60J 5/0452 |
| | | | 296/146.6 |
| 2015/0137558 A1 | 5/2015 | Ayuzawa | |
| 2016/0185175 A1 | 6/2016 | Kim | |
| 2018/0022397 A1* | 1/2018 | Richardson | B62D 25/00 |
| | | | 296/187.03 |
| 2018/0244323 A1 | 8/2018 | Vigil | |
| 2020/0089621 A1 | 3/2020 | Dusanapudi | |
| 2022/0111906 A1* | 4/2022 | Freeman | B62D 29/001 |

* cited by examiner

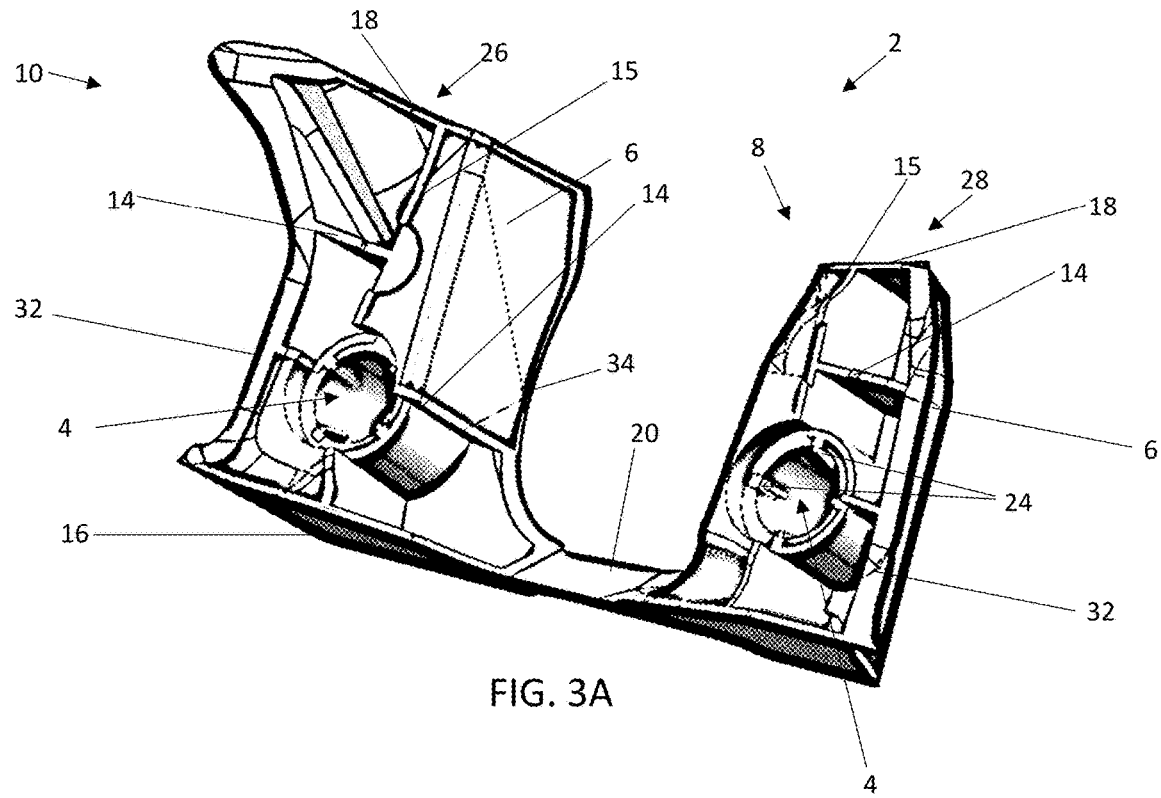
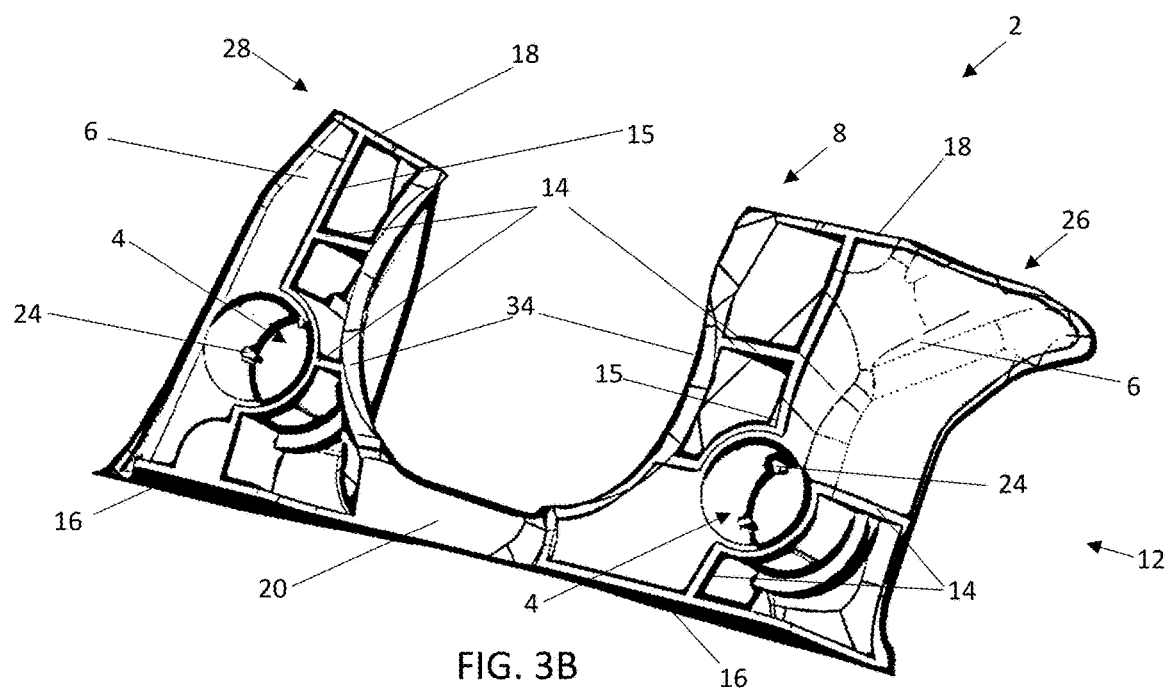
FIG. 3A
FIG. 3B

SUSPENSION MOUNTS FOR A VEHICLE

FIELD

The present teachings generally relate to an improved suspension mount.

BACKGROUND

Typically, vehicle suspension mounts (e.g. shock mounts, strut mounts, spring mounts) are two or more separate pieces that are installed on either the right or the left side of vehicle. However, because the suspension mounts are separate pieces, it is easy to incorrectly place the right mount onto the left side of the vehicle during manufacture and vice versa.

Additionally, typical suspension mounts add little to no structural reinforcement, while also being thick and blocky with subpar NVH insulation, resulting in a lesser ride quality for the occupant of a vehicle which traditional suspension mounts are used.

It would be attractive to have a suspension mount which houses and connects both left and right shock mount locations. It would be attractive to have a suspension mount which cannot be installed on the wrong side of a vehicle during manufacture. It would be attractive to have a suspension mount with added structural reinforcement for the vehicle. It would be attractive to have a suspension mount which was thinner and lighter while providing superior NVH characteristics to improve a vehicle occupant's experience while traveling down the road.

SUMMARY

The present teachings meet one or more of the present needs by providing: A suspension mount comprising a carrier with a first portion and a second portion, an activatable material selectively disposed on the carrier, one or more bridges connecting the first portion and the second portion of the carrier, wherein the first portion and the second portion of the carrier each include one or more damper mounts, and wherein the first portion corresponds to a left side and the second portion corresponds to the right side so that the suspension mount is attachable to a vehicle in one direction.

The teachings herein provide a suspension mount for mounting dampers and other suspension components to which is lighter and stronger than previous mounts. The suspension mount of the present teachings combines lightweight materials with activatable material to create a more robust suspension mount which is cheaper than alternative methods with an increased modulus. The suspension mount of the present teachings eliminates inadvertent errors in placement and attachment traditionally associated with suspension mounts.

BRIEF DESCRIPTION OF THE DRAWINGS

FIG. 3A is a perspective view of a first surface of a suspension mount consistent with the teachings herewith.

FIG. 3B is a perspective view of a second surface of a suspension mount consistent with the teachings herewith.

DETAILED DESCRIPTION

Figure 1:
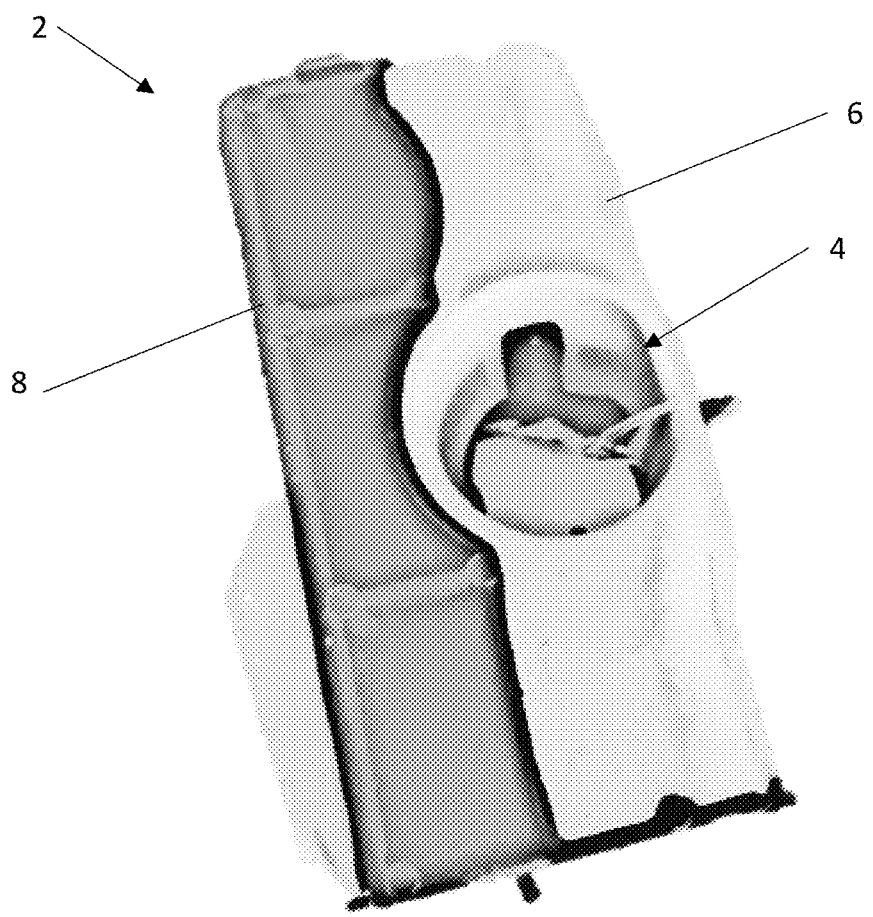
FIG. 1 is a perspective view of a prior art mount.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

This application claims the benefit of the filing date of U.S. Provisional Application Ser. No. 62/837,880 filed on Apr. 24, 2019, the contents of that application being incorporated by reference herein for all purposes.

The present teachings relate to a reinforced suspension mount for both the left and right suspension components of the vehicle. The suspension mount installs in one direction, eliminating the possibility of installing the part on the wrong side of the vehicle. The suspension mount is lighter and thinner with increased rigidity and superior NVH characteristics, as well as more robust. The present teachings provide for a suspension mount which is less expensive, while providing superior strength with a lighter weight. The advantages of the present teachings are derived from the combination of materials, the elimination of multiple parts (e.g. one part for both the left and right side), and the location of activatable material and reinforcing structures.

The teachings may generally relate to a suspension mount and reinforcement. The reinforcement structure may be a composite structure and may specifically be adapted to provide sealing, baffling or reinforcement within a cavity of a vehicle. It is contemplated that the reinforcement structure may be applied (e.g., assembled) to various vehicle which include dampers and springs. It has been found however, that the reinforcement structure is particularly suitable for application to automotive vehicles. The suspension mount of the present teachings is adapted to be used with automotive vehicles such that one suspension mount may be used in the rear of the vehicle, providing suspension mounting locations for the left and right sides. Additionally, a second suspension mount may be used at the front of the vehicle to mount front suspension components on both the left and right sides.

The suspension mount may be a composite. The composite suspension mount may find particular use in absorbing impact associated with an impact load. An impact load may be understood as a force generated by impact to a surface of a vehicle, such as during a collision, during normal driving on road, during off-road driving, or a combination thereof. The composite suspension component may include a formed carrier and an activatable material. The formed carrier may be made of plastic, steel, reinforced fibers, or a combination thereof. For example, the reinforcement structure may be disposed within a cavity and provide reinforcement and structural rigidity to a vehicle, a frame system, a quarter panel, a roof system, a wheel house, the like, or any combination thereof. For example, the suspension mount may provide additional reinforcement and rigidity to a D-pillar of a vehicle. The composite mount may absorb and distribute large and small impacts such that at least a portion of the impact load is not transferred into the passenger compartment.

The suspension mount may include a carrier. The carrier may function to absorb and/or distribute energy from an impact load; provide a surface of activatable material, affix one or more suspension components thereto, or any combination thereof. The carrier may have any size, shape, and/or configuration to absorb and/or distribute energy from an impact load; provide a surface of activatable material, affix one or more suspension components thereto, or any combination thereof. Preferably, the carrier is shaped to connect a first portion and a second portion of the suspension mount so that both sides are joined together to increase rigidity and strength. The carrier may include a first surface and a second surface (e.g. top and bottom). The carrier may be integrally molded or formed from a single material. The carrier may be made of plastic, composite, steel, or a combination thereof. For example, the carrier may be thermoformed plastic. In another example, the carrier may be made of a composite material of reinforced fibers, plastic, steel, or a combination of at least two or more. The carrier may include an activatable material which may be located only onto select portions of the carrier. The carrier may include one or more portions adjacent to one another. The carrier may be coated with activatable material. The carrier may be partially coated by activatable material (e.g. 1%-100%). The carrier may be free of the activatable material. The carrier may include one or more cell-like structures. The carrier may include one or more reinforcements. The carrier may include one or more walls. The carrier may include one or more holes. The carrier may include a base between portions or joining portions of the carrier.

The carrier may include one or more reinforcements. The one or more reinforcements may function to provide structural reinforcement to the suspension mount. The carrier may include one or more, two or more, three or more, four or more, five or more, ten or more, or even a plurality of reinforcements. The one or more reinforcements may be one or more walls, one or more bridges, one or more cell-structures, one or more ribs, one or more carriers, or a combination thereof. The one or more reinforcements may be added to the carrier or integrated into the suspension mount. The location of the one or more reinforcements in combination with the location of the activatable material may increase the stiffness and rigidity of the location which the suspension mount is placed.

The carrier may include one or more walls. The one or more walls may function to reinforce the carrier. The one or more walls may be integrally formed in the carrier. The one or more walls may be located on the perimeter of the carrier. The one or more walls may be located within the carrier. The one or more walls may be made of the same material as the carrier. The one or more walls may be made of a different material than the carrier. The one or more walls may have a first surface and a second surface (e.g. inner surface; outer surface). The one or more walls may provide exceptional reinforcement and stiffness to the suspension. The one or more walls may be completely coated with activatable material. The one or more walls may be partially coated by activatable material (e.g. 1%-99%). The one or more walls may be free of the activatable material.

The carrier may include one or more bridges. The one or more bridges may function to reinforce and connect the left side and the right side of the suspension mount, increasing stiffness and strength. The suspension mount may include one or more, two or more, three or more, or even a plurality of bridges. The one or more bridges may be longitudinal, vertical, or both. For example, the suspension mount may include one bridge spanning from the left side to the right side along a first end wall creating a U-shaped carrier. In another example, the suspension mount may include a first bridge at the first end wall, and a second bridge at the second end wall, the first and second bridge each connecting the first portion and the second portion of the suspension mount together. The one or more bridges may provide exceptional reinforcement and stiffness to the suspension. The one or more bridges are preferably formed with the carrier as one piece, so that the first portion and the second portion of the carrier are connected by one or more bridges. The one or more bridges may be completely coated with activatable material. The one or more bridges may be partially coated by activatable material (e.g. 1%-99%). The one or more bridges may be free of the activatable material.

The carrier may include one or more ribs. The one or more ribs may function to increase stiffness and strength of the entire suspension mount. The carrier may include one or more, two or more, three or more, five or more, ten or more, or even a plurality of ribs. The one or more ribs may be integrally formed with the carrier. The one or more ribs may be added to the carrier. The one or more ribs may be made of plastic, steel, composite, or a combination thereof. The one or more ribs may be positioned longitudinally, transversely, angularly, or a combination thereof. The one or more ribs may be located between an inner wall and an outer wall. The one or more ribs may be located between a first end wall and a second end wall. The one or more ribs may be located adjacent to an end wall. The one or more ribs may be located parallel to one or more of the one or more end walls, one or more inner walls, one or more outer walls, one or more bridges, or a combination thereof. The one or more ribs may be completely coated with activatable material. The one or more ribs may be partially coated by activatable material (e.g. 1%-99%). The one or more ribs may be free of the activatable material.

The carrier may include one or more damper mounts. The one or more damper mounts may function to accept a spring, a damper, a shock, a strut, other suspension components, or a combination thereof. The carrier may include one or more, two or more, three or more, four or more, or even a plurality of damper mounts. Preferably, the carrier includes one damper mount per portion of the carrier. For example, the carrier includes a first damper mount on the first portion of the carrier, and a second damper mount on a second portion of the carrier. The one or more damper mounts may be integrally formed within the carrier. The one or more damper mounts may be separate parts attached to the carrier. The one or more damper mounts may be plastic, steel, composite, or a combination thereof. The one or more damper mounts be completely coated with activatable material. The one or more damper mounts may be partially coated by activatable material (e.g. 1%-99%). The one or more damper mounts may be free of the activatable material. The one or more damper mounts may be disposed through the carrier from a first surface to a second surface. The one or more damper mounts may be partially disposed through at least one surface of the carrier. The one or more damper mounts may be located on a surface of the carrier.

The one or more damper mounts may include one or more mounting tabs. The one or more mounting tabs may function to secure a damper within the damper mounts. Each of the one or more damper mounts may include one or more, two or more, three or more, four or more, or even a plurality of mounting tabs. The one or more mounting tabs may be made of plastic, steel, composite, or a combination thereof. The one or more mounting tabs may be integrally formed within the damper mounts.

The suspension mount may include an activatable material. The activatable material may assist in providing structural reinforcement, adhesion, baffling, acoustical damping properties or a combination thereof within a cavity of, or upon a surface of a structure, or to one or more structural members of an article of manufacture. As used herein, the phrase activatable material includes any material that may be activated to melt, flow, cure (e.g., thermoset), expand, foam or a combination thereof by an ambient condition or another condition. For example, the material may expand, foam, flow, melt, cure, a combination thereof or the like upon exposure to a condition such as heat, pressure, chemical exposure, combinations thereof or the like. The activatable material may completely cover the carrier, the reinforcements, the ribs, the walls, the bridges, or a combination thereof. The activatable material may be selectively located on and coat between VA and 99% of the carrier, the reinforcements, the ribs, the walls, the bridges, or a combination thereof. The carrier, the reinforcements, the ribs, the walls, the bridges, or a combination thereof may be free of the activatable material. The activatable material may be structurally reinforcing upon activation. The activatable material may provide sealing and baffling to the suspension mount. The activatable material may be expandable. The activatable material may be applied to the suspension mount in one shot. The activatable material may attach the suspension mount to a vehicle.

The activatable material typically includes a polymeric particle, polyvinyl butyral, and carboxyl-terminated polymer. The activatable material may further include one or a combination of an epoxy/elastomer adduct, a flexibilizer, a thermoplastic epoxy, a phenoxy resin, a blowing agent, a curing agent and one or more fillers.

The activatable material of the present teachings may be applied to various articles of manufacture for adding structural integrity to portions or members of the articles. Examples of such articles of manufacture include, without limitation, household or industrial appliances, furniture, storage containers, buildings, structures, or the like. The activatable material may be applied to portions of an automotive vehicle such as body or frame members (e.g., a vehicle frame rail) of the automotive vehicle. One method of the present teachings contemplates applying the activatable material to a surface of one of the above structures in an unexpanded or partially expanded state and activating the material for expanding (e.g., foaming) it to a volume greater than its volume in the unexpanded state (e.g., at least 5% greater, at least 20% greater, at least 50% greater, at least 100% greater, at least 200% greater, at least 400% greater or higher). It is also typically preferred at least for reinforcement application that the volumetric expansion such that the expanded volume is less than 800%, more typically less than 500%, even more typically less than 400% and possibly less than 300% relative to the original unexpanded volume. It is also contemplated that the volume of the material may be less after activation due to curing (e.g., cross-linking) for foamed or unfoamed versions of the activatable material.

The material may be formulated to include an adduct, which may be an epoxy elastomer adduct. The epoxy elastomer adduct imparts a plasticization effect to the activatable material and the ability to initiate plastic deformation. Various epoxy/elastomer adducts may be employed in the present teachings. The epoxy/elastomer hybrid or adduct may be included in an amount of up to about 75% by weight of the activatable material. The epoxy elastomer adduct may be approximately at least about 5% by weight, more typically at least about 10% by weight, more typically at least about 15% by weight, and even more typically at least about 20% by weight of the activatable material. The epoxy elastomer adduct may be approximately about 75% or less by weight, more typically about 70% or less by weight, more typically about 65% or less by weight, and even more typically 60% or less by weight of the activatable material. The elastomer-containing adduct may be a combination of two or more particular adducts. The adducts may be solid adducts, liquid adducts or semisolids at a temperature of 23° C. or may also be some combination thereof. It is possible that the adduct is composed of substantially entirely (i.e., at least 70%, 80%, 90% or more) of one or more adducts that are solid at a temperature of 23° C. The adduct may be used together with a polymeric particle, such as methacrylate-butadiene-styrene (MBS), and a polymeric material such as polyvinyl butyral (PVB), which may achieve desirable adhesive performance and physical properties over a wide range of temperatures, even when employing a relatively small amount of the adduct.

Generally, it is preferable for the activatable to include at least one polymeric particle. Such polymeric particles may be utilized to improve fracture toughness ($G_{1C}$), peel resistance and impact resistance. As used herein, like with any other ingredients of the present teachings, the term "polymeric particle" can include one or more polymeric particles. Various polymeric particles may be employed in the practice of the present teachings and often include one or more elastomers. It is generally preferable for the polymeric particles to be at least 4%, more typically at least 7%, even more typically at least 10%, still more typically at least 13% and even still more typically at least 16% by weight of the activatable material and also preferable for the polymeric particle to be less than 90%, more typically less than 40% an even more typically less than 30% by weight of the activatable material, although higher or lower amounts may be used in particular embodiments.

The polymeric particle may include one or more core/shell polymers which may be pre-dispersed in an epoxy. The process for forming the core shell materials in a liquid epoxy avoids agglomeration of the core shell particles as may be common with "dry" core shell polymeric particles (e.g., agglomeration may occur during the drying process). An example of products made by this process may be described in one or more of U.S. Pat. Nos. 3,984,497; 4,096,202; 4,034,013; 3,944,631; 4,306,040; 4,495,324; 4,304,709; and 4,536,436. The polymeric particles may be formed through an emulsion polymerization process. This process may include the addition of a solvent with the resin. As a result of incompatibility between the resin/solvent and water, the water settles out of the material as the core shell particles move into the resin, resulting in reduced agglomeration. Alternatively, a high-speed dispersion can be effective at de-agglomerating core/shell materials. However, a surfactant may remain post spray drying or coagulating the core/shell material. This residual surfactant may be detrimental for the material's resistance to environmental exposure conditions that involve water such as salt spray and humidity. Materials not exposed to the environmental exposure conditions would typically not show a difference between dry and liquid provided that there is sufficient de-agglomeration of the dry material.

The activatable material may include a polymer, or other additive for increasing strength, strain to failure, and/or expansion properties. The additive may allow the material to have an improved balance between Young's modulus (as measured by ASTM D638) and strain to failure as compared to materials without the additive. For example, the additive may allow both modulus and strain to failure to be increased simultaneously as opposed to a material without the additive. After curing, the material may exhibit a tensile modulus of at least about 500 MPa, more typically at least about 700 MPa, and even more typically at least about 900 MPa. After curing, the material may exhibit a tensile modulus of about 1500 MPa or less, more typically about 1200 MPa or less, and even about 1000 MPa or less. The additive may allow the activatable material to have a higher volumetric expansion during activation as compared to a material without the additive. The additive may allow for increased volumetric expansion while increasing or at least maintaining modulus. After curing, the activatable material may exhibit a volumetric expansion from the pre-cured state of at least about 200%, more typically least about 250%, and more typically at least about 300%, and even more typically at least about 330%. After curing, the activatable material may exhibit a volumetric expansion from the pre-cured state of about 500% or less, more typically about 450% or less, more typically about 400% or less, and even more typically about 300% or less.

The additive may assist in providing desirable physical properties to the activatable material, especially when used in combination with a core/shell polymeric particle, the epoxy-elastomer adduct, or both. The additive for increasing modulus, strain to failure, and/or volumetric expansion may be any additive capable of achieving both while maintaining other desired properties of the activatable material. An exemplary additive is polyvinyl butyral (PVB). Polyvinyl butyral may be approximately at least about 5% by weight, more typically at least about 10% by weight, and even more typically at least about 15% by weight of the activatable material. Polyvinyl butyral may be approximately about 30% or less by weight, more typically about 25% or less by weight, and even about 20% or less by weight of the activatable material. A suitable example of polyvinyl butyral may include CCP Polyvinyl Butyral resin B08HX.

The material may include a flexibilizer. The use of the term flexibilizer can relate to a single flexibilizer or a combination of multiple different flexibilizers. Although other flexibilizers may be employed, preferred flexibilizers include polymers that are amine modified, epoxy modified, or both. These polymers can include thermoplastics, thermosets or thermosettables, elastomers, combinations thereof or the like. These polymers may be modified with aromatic or non-aromatic epoxy and/or may be modified with bisphenol-F type, bisphenol-A type, combinations thereof or other type epoxy. Examples of preferred flexibilizer are epoxidized polysulfides sold under the tradenames EPS-350 and EPS-80, commercially available from Akzo Nobel.

Phenol-containing molecules such as the flexibilizer Rez-Cure EP 1820 (available from Innovative Resin Systems) is one possible material that may be utilized. An example of another preferred flexibilizer is an epoxy-dimer acid elastomer sold under the tradenames HYPDX DA 323, commercially available from CVC Specialty Chemicals. An example of other preferred flexibilizers are polyurethane modified epoxies sold under the tradenames GME-3210 and GME-3220, commercially available from GNS Technologies. Without being bound by theory, it is believed that when a polyurethane modified epoxy flexibilizer is included the activatable material may substantially maintain impact strength (e.g., impact resistance) at low temperatures, while minimizing the reduction of glass transition temperature (Tg) (e.g., as compared to other flexibilizers). Yet further examples of preferred flexibilizer are amine or epoxy terminated polyethers such as JEFFAMINE D-2000, commercially available from Huntsman and DER 732, commercially available from the Dow Chemical Company. Flexibilizers based on cashew nutshell liquid such as the epoxidized liquids Cardolite NC-514 and Cardolite Lite 2513 HP are also useful flexibilizers. All of the individual flexibilizers discussed herein may be used separately or in combination with each other in the material of the present teachings, unless otherwise stated.

Typically, the flexibilizer is at least 1 more typically at least 2% and even possibly at least 5% by weight of the material but is typically less than 50%, more typically less than 35% and even possibly less than 20% by weight of the material, although higher and lower values may also be possible unless otherwise stated. It is also contemplated in particular that the amount of flexibilizing agent may be higher in embodiments where the agent is modified with an epoxy component.

The material described herein includes a base resin comprising one or more epoxide functional materials and polyvinyl butyral. An epoxy resin (e.g., an epoxy resin that is distinct from any epoxy resin included as part of the polymeric particle composition) may be added to the activatable material to increase the adhesion, adhesion durability, flow properties or some combination thereof of the material. The epoxy material may further act as component to a crosslinking network upon cure of the material. One exemplary epoxy resin may be a phenolic resin, which may be a novolac type or other type resin. Other preferred epoxy containing materials may include a bisphenol-A epichlorohydrin ether polymer, or a bisphenol-A epoxy resin which may be modified with butadiene or another polymeric additive or bisphenol-F-type epoxy resins. Moreover, various mixtures of several different epoxy resins may be employed as well. The epoxy resins may be silane modified epoxy resins or silicone free epoxy resins. For example, a silane modified epoxy resin may aid in allowing the activatable material to adhere to metal, such as to aluminum. The epoxy resins may contain carboxylic acid groups.

The material may include a phenoxy resins component. Phenoxy resins are high molecular weight thermoplastic condensation products of bisphenol A and epichlorohydrin and their derivatives. The phenoxy resins that may be employed may be of the basic formula:

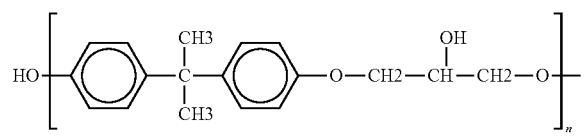

where n is typically from 30 to 100 preferably from 50 to 90. Modified phenoxy resins may also be used. Examples of phenoxy resins that may be used are products marketed by Inchem Corp. Examples of suitable materials are the PKHB, PKHC, PKHH, PKHJ, PKHP pellets and powder. Alternatively, phenoxy/polyester hybrids and epoxy/phenoxy hybrids may be used. In order to enhance the production of the activatable material it is preferred that the phenoxy resin be supplied to the other components as a solution. While any solvent may be used it is particularly preferred to use a liquid epoxy resin as the solvent as this can also contribute to the adhesive properties upon activation.

One or more blowing agents may be added to the activatable material for producing inert gasses that form, as desired, an open and/or closed cellular structure within the activatable material. In this manner, it may be possible to modify the density of articles fabricated from the material as required for a particular application.

The blowing agent may include one or more nitrogen containing groups such as amides, amines and the like. Examples of suitable blowing agents include azodicarbonamide, dinitrosopentamethylenetetramine, 4,4$_t$-oxy-bis-(benzenesulphonylhydrazide), trihydrazinotriazine and N,N$_t$-dimethyl-N,N$_t$-dinitrosoterephthalamide. The material may include a physical blowing agent, including but not limited to agents such as Expancel available from AkzoNobel. Alternatively, the material may be manufactured according to the MuCell process available from Trexel.

An accelerator for the blowing agents may also be provided in the activatable material. Various accelerators may be used to increase the rate at which the blowing agents form inert gasses. One preferred blowing agent accelerator is a metal salt, or is an oxide, e.g. a metal oxide, such as zinc oxide. Other preferred accelerators include modified and unmodified thiazoles, ureas and imidazoles.

Amounts of blowing agents and blowing agent accelerators can vary widely within the activatable material depending upon the type of cellular structure desired, the desired amount of expansion of the activatable material, the desired rate of expansion and the like. Exemplary ranges for the amounts of blowing agents and blowing agent accelerators in the activatable material range from about 0.001% by weight to about 5% by weight and are preferably in the activatable material in fractions of weight percentages. The blowing agent may be at least about 0.5% by weight, more typically at least about 1% by weight, and even more typically about 1.2% by weight of the activatable material. The blowing agent may be about 2.5% or less by weight, more typically about 2.0% or less by weight, and even more typically about 1.8% or less by weight of the activatable material. Exemplary blowing agents may include Cellcom CF810 and Celogen® 754A.

The present teachings also contemplate the omission of a blowing agent. Preferably, however, the material, the blowing agent or both of the present teachings are thermally activated. Alternatively, other agents may be employed for realizing activation by other means, such as moisture, radiation, or otherwise.

The activatable material may include one or more additional polymers or copolymers, which can include a variety of different polymers, such as thermoplastics, elastomers, plastomers combinations thereof or the like. For example, and without limitation, polymers that might be appropriately incorporated include halogenated polymers, polycarbonates, polyketones, urethanes, polyesters, silanes, sulfones, allyls, olefins, styrenes, acrylates, methacrylates, epoxies, silicones, phenolics, rubbers, polyphenylene oxides, terphthalates, acetates (e.g., EVA), acrylates, methacrylates (e.g., ethylene methyl acrylate polymer) or mixtures thereof. Other potential polymeric materials may be or may include, without limitation, polyolefin (e.g., polyethylene, polypropylene) polystyrene, polyacrylate, poly(ethylene oxide), poly(ethyleneimine), polyester, polyurethane, polysiloxane, polyether, polyphosphazine, polyimide, polyimide, polyisobutylene, polyacrylonitrile, poly(vinyl chloride), poly(methyl methacrylate), poly(vinyl acetate), poly(vinylidene chloride), polytetrafluoroethylene, polyisoprene, polyacrylamide, polyacrylic acid, polymethacrylate.

When used, these polymers can comprise a small portion or a more substantial portion of the expandable material (e.g., up to 85% by weight or greater). Preferably, the one or more additional polymers comprises about 0.1% to about 50%, more preferably about 1% to about 20% and even more preferably about 2% to about 10% by weight of the activatable material.

Although not required, it is possible for the polymeric admixture to include one or more ethylene polymers or copolymers such as ethylene acrylates, ethylene acetates or the like. Ethylene methacrylate and ethylene vinyl acetate are two preferred ethylene copolymers. It is also possible that the material may be free of any ethylene polymers or copolymers.

It may also be desirable to include a reactive polyethylene resin that is modified with one or more reactive groups such as glycidyl methacrylate or maleic anhydride. Examples of such polyethylene resins are sold under the tradename LOTADER® (e.g., LOTADER AX 8900) and are commercially available from Arkema Group.

One or more curing agents and/or curing agent accelerators may be added to the activatable material. Amounts of curing agents and curing agent accelerators can, like the blowing agents, vary widely within the activatable material depending upon the type of cellular structure desired, the desired amount of expansion of the activatable material, the desired rate of expansion, the desired structural properties of the activatable material and the like. Exemplary ranges for the curing agents or curing agent accelerators present in the activatable material range from about 0.001% by weight to about 7% by weight.

It is possible that the curing agents assist the activatable material in curing by crosslinking of the polymers, epoxy resins or both. It is also possible for the curing agents to assist in advancing or chain extending the activatable material. Useful classes of curing agents are materials selected from aliphatic or aromatic amines or their respective adducts, amidoamines, polyamides, cycloaliphatic amines, anhydrides, polycarboxylic polyesters, isocyanates, phenol-based resins (e.g., phenol or cresol novolak resins, copolymers such as those of phenol terpene, polyvinyl phenol, or bisphenol-A formaldehyde copolymers, bishydroxyphenyl alkanes or the like), or mixtures thereof. Particular preferred curing agents include modified and unmodified polyamines or polyamides such as triethylenetetramine, diethylenetriamine tetraethylenepentamine, cyanoguanidine, dicyandiamides and the like. An accelerator for the curing agents (e.g., a modified or unmodified urea such as methylene diphenyl bis urea, an imidazole or a combination thereof) may also be provided for preparing the activatable material.

The activatable material may also include one or more reinforcement components. Preferably the reinforcement components include a material that is generally non-reactive with the other components present in the activatable material. It is contemplated that the reinforcement components may also impart properties such as strength and impact resistance to the activatable material.

Examples of reinforcement components include wollastonite, silica, diatomaceous earth, glass, clay (e.g., including nanoclay), glass beads or bubbles, glass, carbon or ceramic fibers, nylon, aramid or polyamide fibers, and the like. The one or more reinforcement components may be selected from mineral reinforcements such as diatomaceous earth, clay (e.g., including nanoclay), pyrophyllite, sauconite, saponite, nontronite, wollastonite, or montmorillonite. The reinforcement component may include a silica and/or calcium mineral reinforcement. The reinforcement component may include glass, glass beads or bubbles, carbon or ceramic fibers, nylon, aramid or polyamide fibers (e.g., Kevlar). The reinforcement component may be wollastonite. The reinforcement component may be a fiber with an aspect ratio of from about 20:1 to about 3:1. The reinforcement component may be a fiber with an aspect ratio of from about 15:1 to about 10:1. The reinforcement component may be a fiber with an aspect ratio of about 12:1. It is possible that the reinforcement component improves a first physical characteristic while simultaneously substantially avoiding any significant detrimental effect on a second physical characteristic. As one example, the selected reinforcement component may improve the overall modulus of the material while still having minimal detrimental on strain to failure. The material may further include one or more fillers including pigments or colorants, calcium carbonate, talc, silicate minerals, vermiculite, mica, or the like.

When employed, the reinforcement components in the activatable material can range from 10% or less to 90% or greater by weight of the activatable material, but more typical from about 20% to 55% by weight of the activatable material. According to some embodiments, the activatable material may include from about 0% to about 30% by weight, and more preferably slightly less than 10% by weight reinforcement components.

It is contemplated that most nearly any additional chemicals, materials or otherwise may be added to the activatable material assuming they are suitable for the activatable material and suitable for a chosen application of the activatable material.

Other additives, agents or performance modifiers may also be included in the activatable material as desired, including but not limited to a UV resistant agent, a flame retardant, a polymeric particle, a heat stabilizer, a colorant, a processing aid, a lubricant or the like.

According to another embodiment, the activatable material may be formed by heating one or more of the components that is generally easier to soften or liquidize such as the polymer-based materials to induce those components into a mixable state. Thereafter, the remaining components may then be intermixed with the softened components. The material may be compounded using a melt processing operation such as a twin screw, a double arm mixer, or some other solution compounding machine.

Depending upon the components used, it may be important to assure that the temperature of the components remains below certain activation temperatures that might cause the activatable material to activate (e.g., form gasses, flow, cure or otherwise activate) or both. Notably, when the activatable material contains a blowing agent, it is typically desirable to maintain the temperature of the activatable material below a temperature that will activate the blowing agent and/or curing agent(s) (e.g., anything that would begin the advancement of the molecular weight of a polymeric material (any reaction within the material) during formation of the activatable material or before the activatable material is applied to a surface. In situations where it is desirable to maintain the activatable material at lower temperatures it may be desirable to maintain the components in a semi-solid or viscoelastic state using pressure or a combination of pressure and heat to intermix the components of the activatable material. Various machines have been designed to avoid applying heat, pressure or both to materials.

FIG. 1 illustrates a perspective view of a known vehicle damper mount. The illustrated damper mount is for a single side. The mount 2 has a damper mount location 4. Activatable material 6 is disposed onto the carrier 8 surrounding the damper mount 4.

Figure 2A:
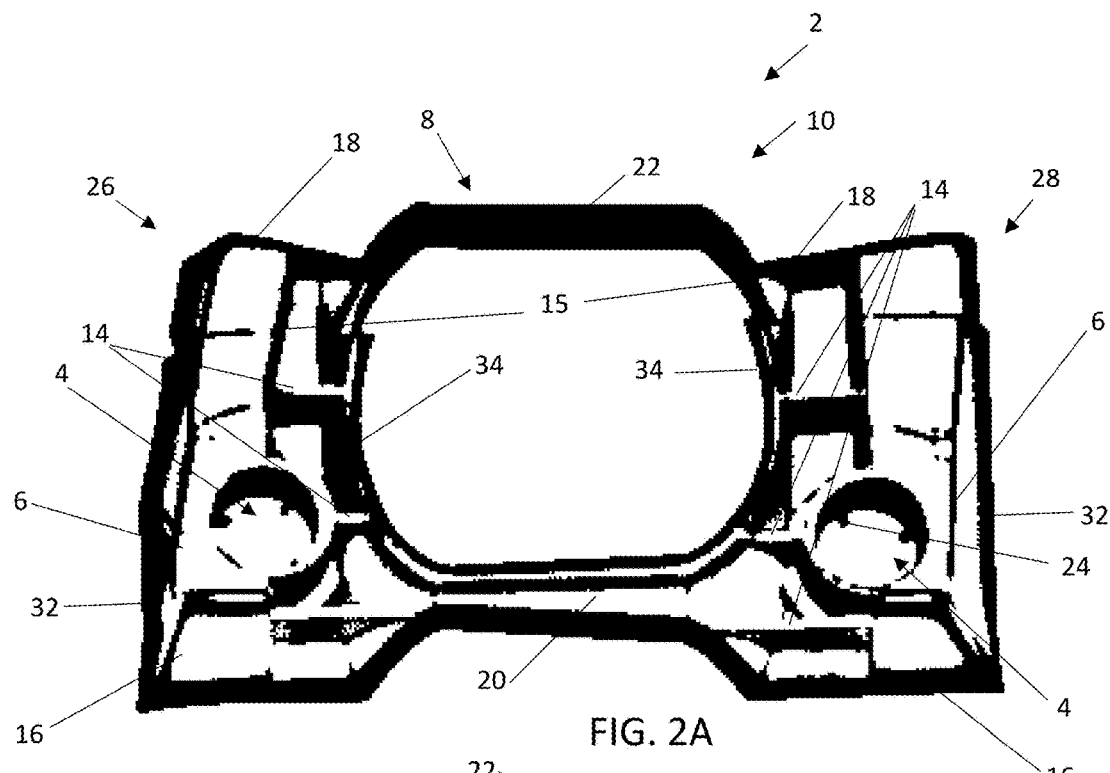
FIG. 2A is a perspective view of a first surface of a suspension mount consistent with the teachings herewith.

FIG. 2A is a perspective view of a first surface 10 of the suspension mount 2. The suspension mount 2 includes a carrier 8 and activatable material 6. The carrier 8 includes a first portion 26 and a second portion 28 connected by bridges 20 and 22. Bridge 20 runs along the first end wall 16 and bridge 22 runs along the second end wall 18. The carrier includes a plurality of transverse ribs 14 projecting from the inner edge 34 towards the outer edge 32, ending at a longitudinal rib 15. Both damper mounts 4 are located towards the first end wall 16 and are surrounded by activatable material 6. The damper mounts 4 include mounting tabs 24 for attaching dampers (e.g. springs, struts, shocks, or the like). In this view, the first surface 10 has the activatable material located on the outer edge 32 of the carrier 8.

Figure 2B:
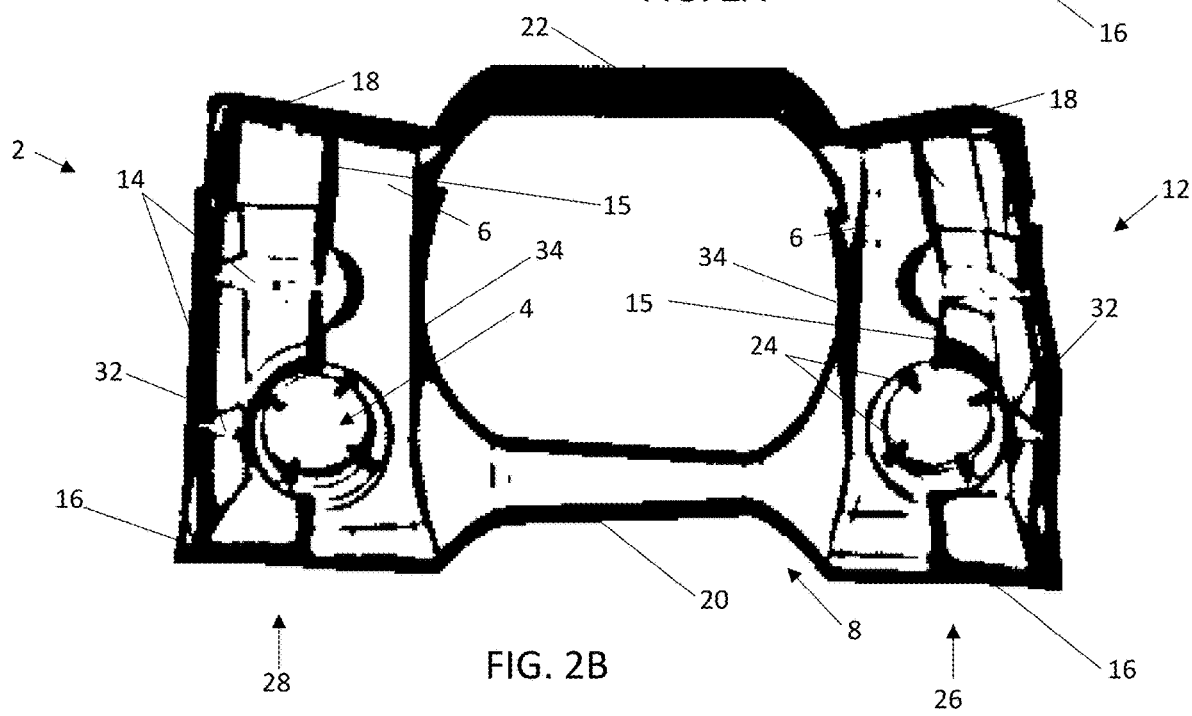
FIG. 2B is a perspective view of a second surface of a suspension mount consistent with the teachings herewith.

FIG. 2B is a perspective view of a second surface 12 of the suspension mount 2. The second surface 12 includes activatable material 6 located across the first bridge 20 and along the inner edge 34 of the carrier. The damper mounts 4 are surrounded with activatable material. Transverse ribs 14 are located from the outer edge 32 projecting inwards towards the inner edge 32, ending at longitudinal ribs 15. The first bridge 20 connects the first portion 26 to the second portion 28 along the first end wall 16. Similarly, the second bridge 22 connects the first portion 26 and the second portion 28 at the second end wall 18. The second bridge 22 projects distally from the second end wall 18.

FIG. 3A is a perspective view of a first surface 10 of a suspension mount 2 consistent with the teachings herewith. The suspension mount 2 includes a carrier 8 and activatable material 6. The carrier 8 includes a first portion 26 and a second portion 28 connected by bridge 20. Bridge 20 runs along the first end wall 16. The carrier includes a plurality of transverse ribs 14 projecting from the outer edge 32 towards the inner edge 34, stopping at the longitudinal rib 15. Both damper mounts 4 are located towards the first end wall 16 and are surrounded by activatable material 6. The damper mounts 4 include mounting tabs 24 for attaching dampers (e.g. springs, struts, shocks, or the like). In this view, the first surface 10 has the activatable material located on both the outer edge 32 and the inner edge 34 of the carrier 8. The bridge 20 is free from activatable material on the first surface 10. Additional activatable material 6 is located between the outer edge 32, the damper mount 4, the first end wall 16, and the longitudinal rib 15 of the first portion 26.

FIG. 3B is a perspective view of a second surface 12 of a suspension mount 2 consistent with the teachings herewith. The second surface 12 includes activatable material 6 substantially located along the outer edge 32 of the carrier 8. The damper mounts 4 are surrounded with activatable material. Transverse ribs 14 are located from the inner edge 32 projecting outwards towards the outer edge 34, ending at longitudinal ribs 15. The bridge 20 connects the first portion 26 to the second portion 28 along the first end wall 16. Additional activatable material 6 is located between the inner edge 34, the damper mount 4 and the first end wall 16 of the first portion 26.

Figure 4:
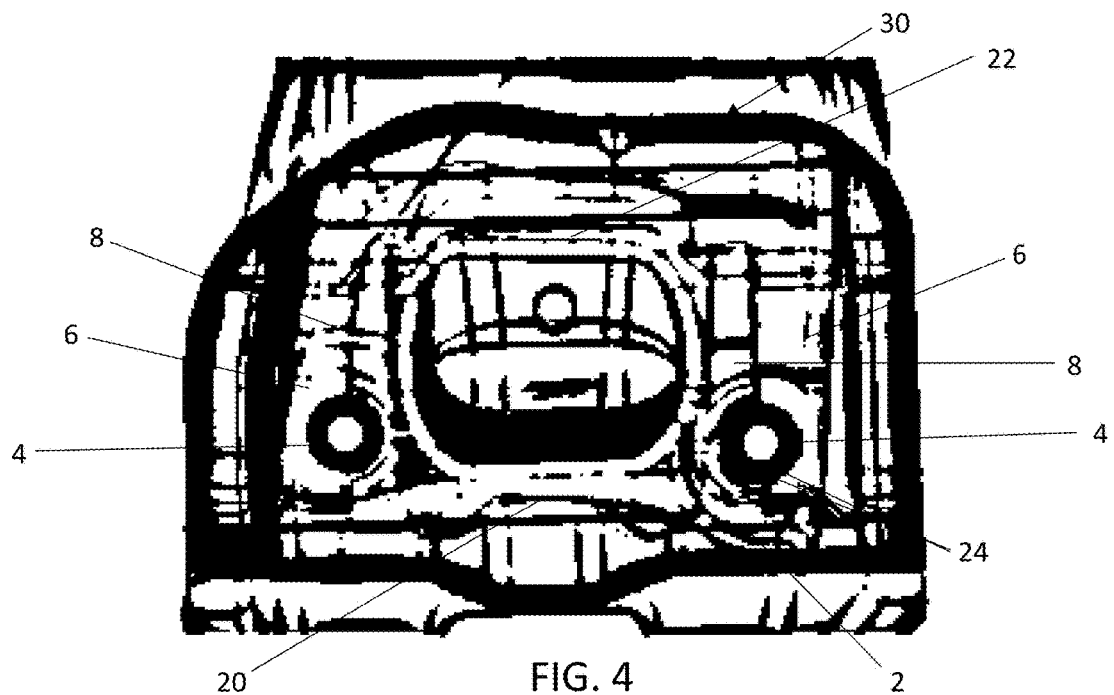
FIG. 4 is a perspective view of a suspension mount consistent with the teachings herewith attached to a vehicle.
Figure 5:
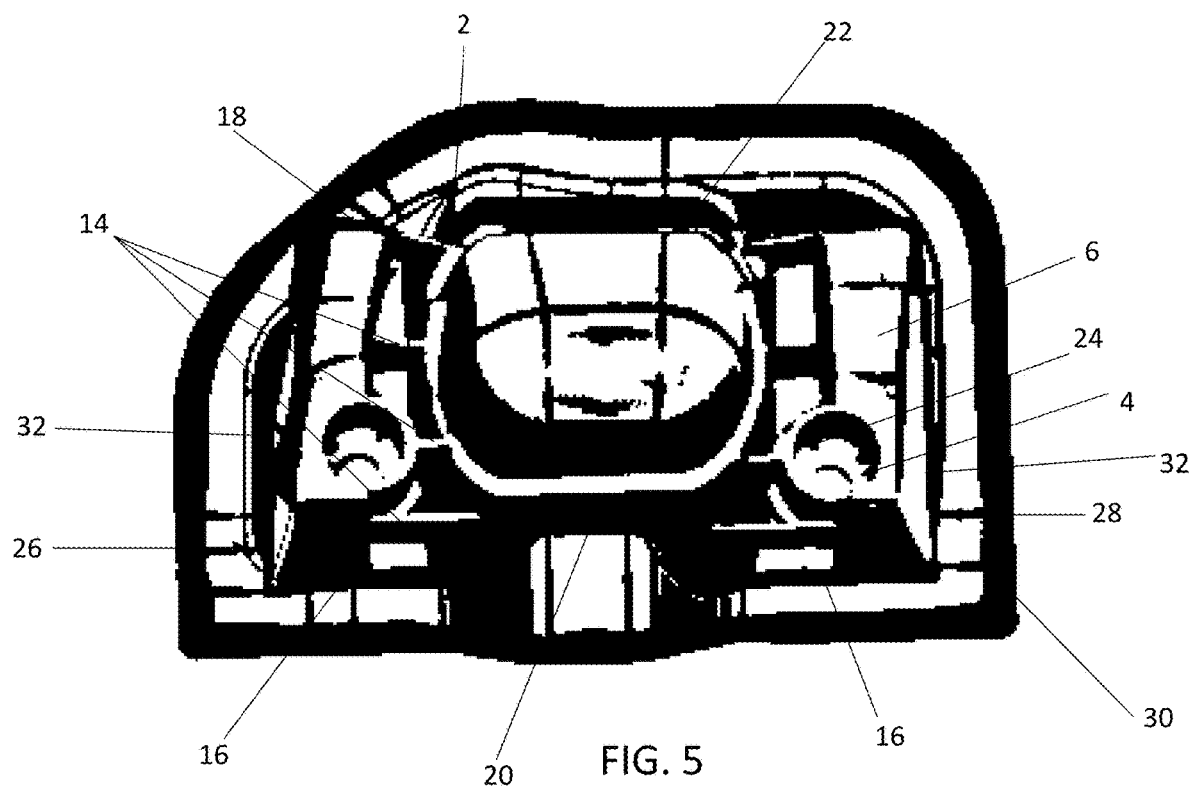
FIG. 5 is another view of a suspension mount consistent with the teachings herewith attached to a vehicle.

FIGS. 4 and 5 is a perspective view of a suspension mount 2 consistent with the present teachings attached within a cavity of a vehicle body 30. The first portion 26 and the second portion 28 of the carrier 8 is connected by a first bridge 20 and a second bridge 22. The carrier 8 includes a plurality of ribs 14 which add structural reinforcement along with bridges 20 and 22. The carrier 8 includes damper mounts 4 with mounting tabs 24 which allow dampers such as springs, struts, and shocks to attach with the carrier 8. Activatable material 6 is selectively disposed on the carrier 8 to promote reinforcement, sealing, and baffling within the vehicle body 30. The activatable material 6 is located around the damper mounts 4 to the outer edge 32, between the first end wall 16 and the second end wall 18, covering a substantial portion of the carrier 8.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, from 20 to 80, or even from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the teachings of a range in terms of at "'x' parts by weight of the resulting polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates examples that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

The invention claimed is:

1. A reinforcement structure for a vehicle mount comprising:
    a carrier with a first portion and a second portion;
    an activatable material selectively disposed on the carrier;
    a plurality of transverse ribs projecting between an inner edge towards an outer edge of each portion of the carrier wherein at least one of the plurality of transverse ribs directly contacts the activatable material and at least one of the plurality of transverse ribs is free of any direct contact with the activatable material;
    wherein at least one of the first portion and the second portion of the carrier include one or more damper mounts; and
    wherein the activatable material is located on an interior wall of the one or more damper mounts and extends continuously onto at least two opposing side walls of the carrier.

2. The reinforcement structure of claim 1, wherein the structure includes at least two rib structures that contact a surface of the one or more damper mounts.

3. The reinforcement structure of claim 2, wherein the activatable material is adapted to expand and at least one of the at least two rib structures is free of any contact with the activatable material prior to expansion.

4. The reinforcement structure of claim 1, wherein the structure includes at least three rib structures that contact a surface of the one or more damper mounts.

5. The reinforcement structure of claim 4, wherein the carrier includes at least two cell-like structures formed from a plurality of ribs and walls.

6. The reinforcement structure of claim 1, wherein the activatable material is adapted to expand and the one or more damper mounts include at least one mounting tab integrally formed within the damper mount.

7. The reinforcement structure of claim 6, wherein the structure includes at least two rib structures that contact a surface of the one or more damper mounts.

8. The reinforcement structure of claim 7, wherein at least one of the at least two rib structures is free of any contact with the activatable material prior to expansion.

9. The reinforcement structure of claim 6, wherein the structure includes at least three rib structures that contact a surface of the one or more damper mounts.

10. The reinforcement structure of claim 9, wherein the one or more damper mounts include at least one mounting tab integrally formed within the damper mount.

11. The reinforcement structure of claim 9, wherein the activatable material bonds the carrier within a cavity of a vehicle.

12. The reinforcement structure of claim 1, wherein the activatable material is selectively activatable e to expand, foam, flow, melt, cure, or any combination thereof upon exposure to a condition such as heat, pressure, or chemical exposure.

13. The reinforcement structure of claim 1, wherein the activatable material bonds the carrier within a cavity of a vehicle.

14. The reinforcement structure of claim 13, including at least one bridge located between the first portion and second portion of the carrier.

15. The reinforcement structure of claim 13, wherein the carrier includes one or more cell-like structures formed from a plurality of ribs and walls.

16. The reinforcement structure of claim 1, including at least one bridge located between the first portion and second portion of the carrier.

17. The reinforcement structure of claim 1, wherein the carrier includes one or more cell-like structures formed from a plurality of ribs and walls.

18. The reinforcement structure of claim 1, wherein the carrier includes at least two cell-like structures formed from a plurality of ribs and walls.

\* \* \* \* \*